United States Patent [19]

Hoefelmayr

[11] 4,273,070

[45] Jun. 16, 1981

[54] MILKING HOSE

[75] Inventor: Tilman Hoefelmayr, Niederteufenar, Switzerland

[73] Assignee: Bio-Melktechnik Swiss Hoefelmayr & Co., Niederteufen AR, Switzerland

[21] Appl. No.: 72,709

[22] Filed: Sep. 4, 1979

[30] Foreign Application Priority Data

Sep. 5, 1978 [DE] Fed. Rep. of Germany ....... 2838659

[51] Int. Cl.³ .......................... A01J 5/00; F16L 11/04
[52] U.S. Cl. .................................. 119/14.51; 138/111
[58] Field of Search ............... 119/14.54, 14.55, 14.46, 119/14.01, 14.02, 14.51; 138/111, 115, 116, 117

[56] References Cited

U.S. PATENT DOCUMENTS 2,425,873   8/1947   Gessler ............................. 119/14.55

FOREIGN PATENT DOCUMENTS 3251 of 1926 Australia ................................ 119/14.54

*Primary Examiner*—Hugh R. Chamblee
*Attorney, Agent, or Firm*—Blanchard, Flynn, Thiel, Boutell & Tanis

[57] ABSTRACT

An elongated milking hose for a quarter milking machine. The milking hose has four elongated, flexible conduits, of which two conduits are connected to one another along a first common connecting segment, extending parallel with respect to the longitudinal axis of the hose. The two other conduits are each arranged on opposite sides of the first connecting segment of the two first conduits and extend parallel therewith and are each connected to the two first conduits along a second and third, and fourth and fifth connecting segment.

5 Claims, 2 Drawing Figures

MILKING HOSE

FIELD OF THE INVENTION

The invention relates to a milking hose for a quarter milking machine.

BACKGROUND OF THE INVENTION

Due to udder illnesses which cannot be controlled, the need for a quarter milking machine has become increasingly clear. Such quarter milking machines have already been used for scientific tests in order to be able to separately examine the efficiency of the individual teats.

However, in the case of existing quarter milking machines, the teat is exposed to a vacuum which is too high due to the action principle of said conventional quarter milking machines, which resulted in abnormal changes of the teat. Only after the introduction of a milking cup having a relief valve which is controlled by the pulsator pressure and which during the relief cycle permits atmospheric air to enter inside of the milking cup, has a satisfactory quarter milking machine been worked out (see copending application Ser. No. 72710, filed concurrently herewith and entitled "Collecting Piece").

However, the difficulty of the quarter milking machines consists in four hoses being required for the separate discharge of the milk from the individual teats and in two pulsator underpressure lines having to be additionally supplied during the operation of four milking cups in an alternate cycle. This results in a chaos of hoses and often in a considerable force being applied onto the collecting piece, in particular when the hoses are reinforced due to an unfavorable reciprocal position. This can result in the individual teats being milked to completion under different pressures and furthermore at the end of a complete milking operation in the occurrence of air leaks at the milking cup, possibly causing the milking cup to fall off from the teat.

Therefore the basic purpose of the invention is to provide the supply lines to a quarter milking collecting piece such that they do not interfere with the milking operation.

This purpose is attained by providing a milking hose for a quarter milking machine which is characterized by four flexible conduits, of which two conduits are connected along a first common connecting segment which extends parallel to the longitudinal axis of the hose and by the two other conduits being each arranged on opposite sides of the first connecting segment of the two first conduits and parallel to same and, further, being connected to the two first conduits along a second and third and a fourth and fifth connecting segment. From this, a total milking hose which consists of several conduits is formed, which in cross section has an approximately rhombic design. From this results a hose which as a whole is compact and which has different flexibility in two directions which are perpendicular with respect to one another. Thus the flexibility on the longer axis is less than in direction of the shorter axis of the rhombus. Due to this increased flexibility in one direction, it is possible for the hose as a whole to twist easily correspondingly with all directions, since it is flexible in all directions during a twisting. The flexibility can be compared approximately to the flexibility of a leaf spring. The hose can be preferably designed such that passages are provided for transmitting the pulsator pressure, which passages are formed between the first, second and third conduit and the first, second and fourth conduit. Thus an arrangement of altogether six combined conduits is obtained. Thus one obtains as a whole an extremely compact hose arrangement. The convenience in handling of the milking tool is thus considerably improved. A particularly preferable arrangement is obtained when the conduits are extruded in one piece with their respective connecting segments.

According to a further solution to the set purpose, a milking hose for a quarter milking process is characterized by the hose which is manufactured in an extrusion method in one piece having four separate conduits with a substantially equal inner cross section and the central longitudinal axis of the conduits are located substantially at the corners of an equilateral rhombus.

In such an arrangement, it is possible to preferably provide also a fifth and, if needed, a sixth conduit, each separate from the remaining conduits, the cross sections of which lie within the area defined by the equilateral rhombus.

Such a hose substantially simplifies the method of operation, since through only one operation, four to six lines can be connected approximately simultaneously to one collecting piece or can be separated therefrom.

BRIEF DESCRIPTION OF THE DRAWING

The invention will be discussed in more detail hereinbelow with reference to the preferred exemplary embodiments which are illustrated in the drawing, in which.

DETAILED DESCRIPTION

Figure 1:
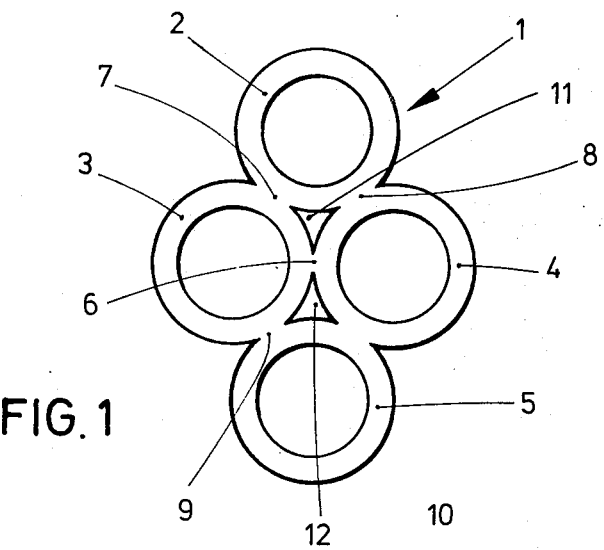
FIG. 1 is a cross-sectional view of a first embodiment of a hose embodying the invention.

Reference numeral 1 of FIG. 1 identifies in general a first embodiment of a milking hose. The hose consists of four hoses 2,3,4 and 5 which are approximately identical in cross section and are connected to one another such that the hoses 3 and 4 are connected along a common centrally located longitudinally extending segment 6. The hoses 2 and 5 are each connected to the hoses 3 and 4 along two connecting segments 7,8 and 9,10 and on opposite sides thereof. The central axes of the hoses 2 and 5 lie in a plane containing the centrally located longitudinal segment 6. The connecting segments 6 to 10 can as a whole be constructed very thinly, so that the advantage results that the segments can be separated if needed along the longitudinal direction of the individual hoses, so that if needed at the ends of the milking hose 1, the individual hoses 2 to 5 can be separately connected to the other lines. A further advantage is achieved in the arrangement illustrated in FIG. 1 in that a space is provided between the connecting segments 6,7 and 8 and between the connecting segments 6,9 and 10 and is substantially triangular in cross section and can be used as additional conduits 11 and 12. These conduits 11 and 12 can be utilized, for example, for transmitting the pulsator pressure to the milking cup. An extremely compact, however, still extremely flexible hose arrangement with altogether six supply conduits or discharge conduits is achieved in this case. To better facilitate a connection of the pulsator-pressure connecting conduits to the conduits 11 and 12, the ends to which the conduits 11 and 12 are to be connected must, if needed, be adjusted to conform to the form of the conduits 11 and 12.

Figure 2:
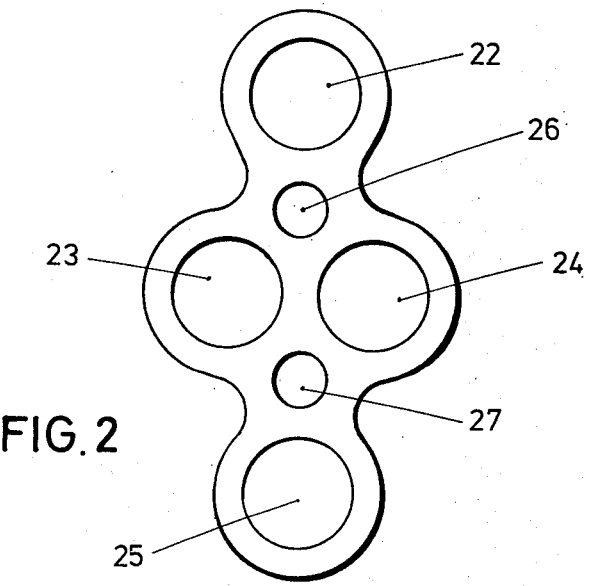
FIG. 2 illustrates a cross-sectional view of a second embodiment of a hose embodying the invention.

A second embodiment is illustrated in FIG. 2, in which four milk discharge passageways 22 to 25 having approximately the same cross section and two pulsator pressure passageways 26 and 27 having the same cross section, however, a reduced cross section compared with the cross section of the passageways 22 to 25, are formed in preferably a one piece, elongated extruded member, wherein the center points of the passageways 22,26,27 and 25 lie in a first common plane, while the center points of the passageways 22 and 24 lie in a second common plane perpendicular to the first plane. Furthermore, the center axes of the passageways 22 to 25 are located at the corners of a rhombus. The hose is particularly well suited to be fastened to a collecting piece in the form of a block connector plug.

If the milking hose is extruded in one piece, the hose should consist preferably of a material, which is elastically deformable and has a quick recovery following a deformation thereof.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a unitary and flexible hose arrangement having at least four separate tubular conduits therethrough, said tubular conduits extending parallel to one another, the improvement comprising wherein the central longitudinal axes of said four tubular conduits each lie substantially at the corners of a rhombus, wherein each of said four tubular conduits are held together by a connection means between the mutually adjacent segments of each of said tubular conduits, said connection means extending over the entire length of said hose arrangement, and wherein at least two further passageways, separate from each of said four tubular conduits, are provided in said hose arrangement one each between three of said connections means between the two sets of three of said mutually adjacent segments of said tubular conduits on opposite sides of the minor axis of said rhombus, said hose arrangement thereby having a greater flexibility characteristic.

2. The milking hose according to claim 1, wherein said connecting means are constructed as thin as possible to increase the flexibility of said hose arrangement.

3. The milking hose according to claim 1, wherein said conduits are with their respective connecting means extruded in one piece.

4. An elongated milking hose for a quarter milking machine, comprising:

an elongated hose body which is manufactured by the extrusion method in one piece and has four separate passageways with a substantially equal inner cross-sectional area, the central longitudinal axes of the passageways being located substantially at the corners of an equilateral rhombus; and at least two additional passageways separate from the remaining four passageways, the cross sectional areas of each of said additional passageways which lies within the area defined by said equilateral rhombus, said milking hose thereby having a greater flexibility characteristic about a minor axis thereof than about a major axis to facilitate an easy use thereof.

5. The milking hose according to claim 1 or claim 4, wherein each of said connecting means is severable to facilitate a separation of the ends of selected ones of said conduits from said hose arrangement.

* * * * *